April 30, 1935.  A. VAN HOUTEN  1,999,522
FISH LURE
Filed June 27, 1932
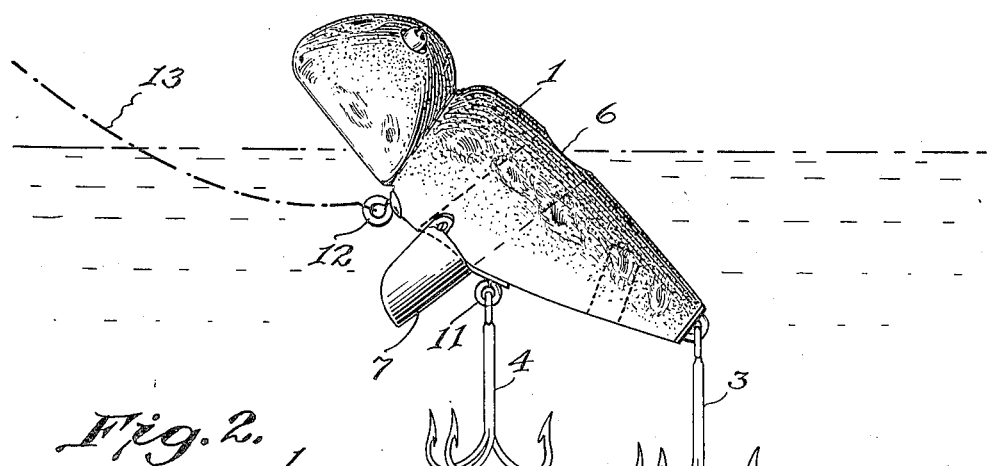
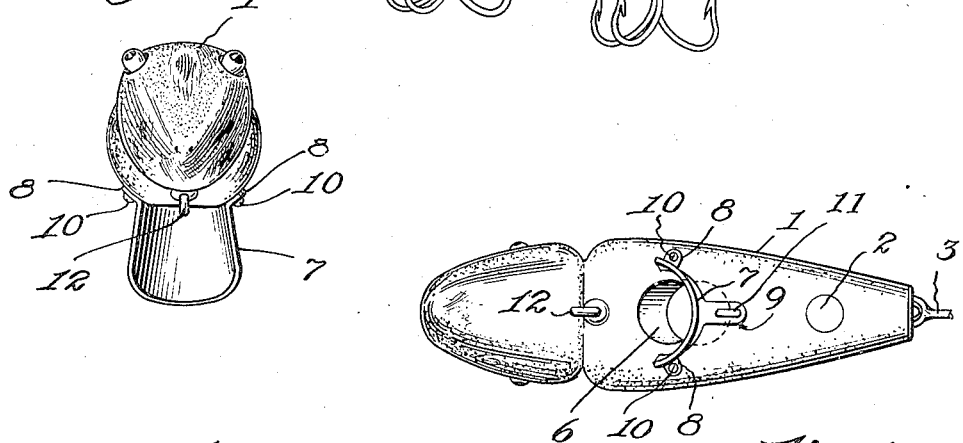
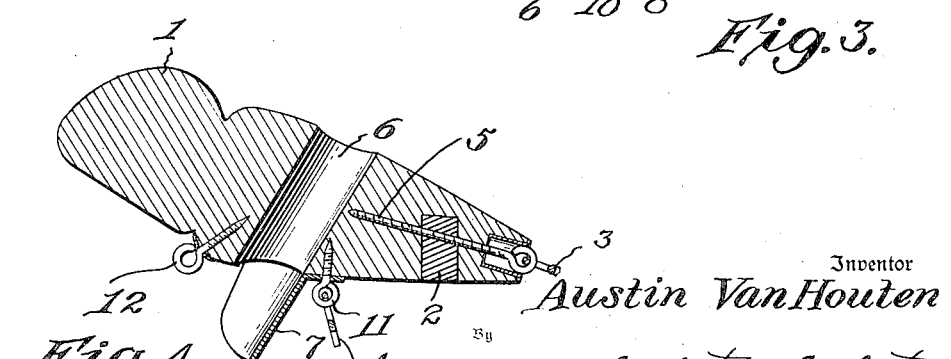
Inventor
Austin Van Houten
Eccleston & Eccleston,
Attorneys Patented Apr. 30, 1935

1,999,522

UNITED STATES PATENT OFFICE 1,999,522

FISH LURE

Austin Van Houten, Garrett, Ind., assignor to Creek Chub Bait Company, Garrett, Ind., a corporation of Indiana Application June 27, 1932, Serial No. 619,558

3 Claims. (Cl. 43—46)

The present invention relates to artificial baits or lures, and the main object thereof is to provide a surface lure which will produce an entirely new, rapid, wiggling or rolling motion, which has been long sought after.

The present invention involves entirely new principles in surface lures, and these principles may be embodied in an almost endless variety of practical forms. Accordingly, the particular form shown, and to be specifically described, is to be considered solely as illustrative, and not in any limiting sense whatever.

This long sought after motion, which has been produced for the first time by the present invention, does not result primarily from any specific structure, but rather from a new arrangement or combination of elements. To produce the best results all of the elements, to be presently described, should be present, and the arrangement of these elements should be substantially as described. But it is to be understood that it is not essential to this invention that all of the several elements be present, or that their arrangement be substantially the same as shown and described herein. In other words, the present invention relates to a lure producing an entirely new and long sought after motion, which motion is best produced by the particular combination and arrangements of elements disclosed herein; but it can also be produced in the absence of one or more of these elements, and in various arrangements of the elements. Among the elements or arrangement of elements which produce the entirely new motion, are the following:

The body of the lure, when at rest, is slightly inclined upwardly toward the head or front end; the rear end being preferably slightly under the water. This is preferably accomplished by weighting the rear end of the lure body, though it obviously may be accomplished by other means.

Extending entirely through the body of the lure from the bottom to the top thereof is a free passage for water. This passage preferably inclines slightly rearwardly from the bottom toward the top.

Some means, such as a scoop or the like, is preferably associated with the passage to impel the water therethrough.

The line should be attached to the lure at the bottom thereof, at some point forwardly of the bottom of the passage and rearwardly of the front end of the lure.

As stated above it is in no manner essential to this invention that all of the above elements be present. With a clear understanding that the present invention is not limited to a specific structure, but to an entirely new combination and arrangement of elements producing an entirely new result, one specific form of the invention will now be described, reference being had to the accompanying drawing, in which, Figure 1 is a side elevational view of the device while at rest in the water.

Figure 2 is a front elevational view of the device.

Figure 3 is a bottom plan view; and

Figure 4 is a vertical longitudinal sectional view.

Referring to the drawing in more detail, numeral 1 refers to the body of the lure. The particular representation here has nothing whatever to do with the invention, as it will be apparent that the body may be made to simulate any desired object, fish, animal or bird, or may be entirely plain. All that is necessary is that the body will float, accordingly it may be made of wood or similar material, or it may be a hollow metallic body.

It is desirable that the body be so constructed that when it is resting idly in the water, the head or forward end will be elevated somewhat above the level of the water, and the rear end be below the level of the water. The particular angle at which the body rests in the water will depend upon various factors, and may be accomplished by various constructions. The most simple construction, and hence the preferred form, is to attach a weight 2 to the rear portion of the body.

Gang hooks 3 and 4 are positioned as desired; in the present embodiment the hook 3 being attached to the rear end of the body, and the hook 4 being attached to the bottom of the body intermediate the ends thereof. Of course the hook may be attached to the body by any desired means, but it might be mentioned that the hook 3 is attached to the eye of a screw bolt 5 which passes through an aperture in the weight 2 thereby firmly securing the latter in place.

It has already been mentioned that one of the desirable elements of the lure is that the body thereof, when idly resting in the water, be inclined upwardly toward the front end, with the front end projecting out of the water. Another element of the combination, and one which is of great importance, is a passage 6 which passes entirely through the body of the lure from the bottom to the top thereof. The fore and aft position of this passage may vary considerably in different lures, but it is always located so as to extend in a vertical plane through the longitudinal center line of the lure. As to the fore and aft position of the passage, it is preferably located at a considerable distance from the forward end of the lure. By reference to the drawing it will be noted that the passage 6 is inclined rearwardly from the bottom toward the top. The angle of inclination of the passage varies in different lures, but it is preferably such that it is at a considerable angle from the vertical when the lure assumes its inclined idle position in the water. In the specific embodiment illustrated the passage is circular in cross-section, but it will be understood that the particular cross-sectional shape of the passage is of no importance, and it may be oval, triangular, square, rectangular, or any other desired shape. The main points are that the passage be inclined rearwardly, and that the passage be a free one so that there is nothing tending to obstruct the free passage of water therethrough. It is not new to have a passage extending through a lure, but the particular arrangement of this passage is believed to be entirely new, and is believed to accomplish a new result, both per se and in combination with other elements.

Another important and highly desirable element of the invention is some means to force water through the passage as the lure is moved upon the surface of the water. In the preferred form, such means constitutes a scoop or the like referred to by numeral 7. Obviously the element for forcing the water into the passage need not be a scoop, within the ordinary meaning of that word, for various constructions may be employed for accomplishing the same purpose. These few modifications are mentioned merely for the purpose illustrating that various forms of construction can be employed for forcing water into the passage, and it is neither necessary nor desirable to attempt to list here all of such forms. The fact is that in accordance with the present invention the lure is tilted upwardly in the water, whereby the rear edge of the opening is lower than the forward edge, and hence there is some tendency for water to be forced into the passage without the use of any additional means. Nevertheless it is most desirable to employ some additional means for this purpose, and as stated above I prefer to use some sort of a baffle or scoop. In the specific embodiment illustrated the scoop 7 is made of sheet metal, and projects downwardly at substantially the angle of inclination of the passage 6; and the sides of the sheet metal are curved forwardly. If a scoop or deflector is employed as the means for forcing water through the passage, it may be of any desired shape or design. The only essential, if such an element be employed, is that it act as a deflector to force water through the passage 6. In the form illustrated the scoop 7 is attached to the bottom of the lure body by means of ears 8 and 9 provided with apertures for the reception of screws 10 and 11, the latter being provided with an eye for pivotally supporting the gang hook 4. Of course the scoop and the hooks may be mounted in place by any desired means.

Another feature of considerable importance, in the particular combination, is the point of attaching the line. By reference to the drawing it will be noted that the line 13 is attached to an eye 12 in the bottom of the lure at a point considerably to the rear of the front end of the lure. The exact point at which the line is attached varies with different forms and sizes of the lure, but is essentially attached at a point forward of the opening of the passage, and preferably at a point a substantial distance from the front end of the lure.

Having described the construction of the device in detail, the operation thereof will now be described.

When the lure is cast and is resting idly on the surface of the water before being retrieved, it assumes an inclined position, with the rear portion preferably submerged and the front end projecting from the water; the position being somewhat similar to that represented in Figure 1. The passage 6 inclines rearwardly from the bottom to the top, and the scoop projects downwardly and forwardly in position to force water through the passage 6 as the lure is retrieved.

The parts being in the position described, when the line is pulled in the retrieving operation, the scoop shaped lip 7 will force water through the passage 6, and by reason of the position of the body in the water and the location of the point where the line connects with the body, the lure has a tendency to rise further in the water so that the head or front end is elevated further above the surface. The water rushes from the opening of the passage in the top of the body in sufficient quantity to give the appearance of the water being agitated by some living animal. As the lure rises and the front end projects further from the water, the action of gravity causes it to topple or tip slightly to one side, and the instant this occurs the change in the angle at which the water strikes the scoop will cause the lure body to assume a position opposite to its first tipped position, and as it swings to this other side the scoop is again presented at a different angle to the water and the lure returns to its first tipped position. The result is that the rushing of the water from the opening at the top of the lure agitates the surface of the water as if caused by a living animal, and the lure is given a rapid rolling, darting or wiggling action which is difficult to describe but which is practically a perfect representation of a fish or other animal darting through the water. It is thought that this rapid rolling, darting or wiggling action is due to the action of gravity on the forward portion of the lure when it is projected further from the water, but this theory may not be entirely correct. But however that may be, the fact is that this most peculiar and highly desirable motion is produced for the first time by the novel combination of elements hereinbefore described.

In accordance with the patent statutes I have described what I now believe to be the preferred embodiment of the invention, but it is apparent that many changes and modifications can be made without departing from the spirit of the invention; and all such changes and modifications are intended to be included within the scope of the appended claims.

What I claim is:

1. An artificial bait or lure including a floating body, a hook secured to the rear end of the body, means other than the hook for causing the lure to normally incline upwardly toward the front end when resting idly in the water, said body being provided with a free passage extending from bottom to top, said passage throughout its length being in a vertical plane extending through the longitudinal center line of the body, and a scoop having its upper surface in substantial alignment with the inner wall of the passage.

2. An artificial bait or lure including a floating body, said body being provided with a free passage from the bottom to the top, the longitudinal axis of said passage being in a vertical plane extending through the longitudinal center line of the body, and a line-attaching means secured to the body of the lure at a point forward of the bottom opening of said passage and rearwardly of the front end of the lure.

3. An artificial bait or lure including a floating body, means causing the lure to incline upwardly toward the front end when resting idly in the water, said body being provided with a free passage extending from bottom to top, said passage being in a vertical plane extending through the longitudinal center line of the body, a line attached to the bottom of the lure forwardly of the bottom opening of said passage, and a scoop secured to the bottom of the floating body having its scooping surface in substantial alignment with the bottom and side walls of the passage.

AUSTIN VAN HOUTEN.